United States Patent Office 3,069,472
Patented Dec. 18, 1962

3,069,472
NOVEL PROCESS FOR PREPARATION OF MERCAPTANS BY CATALYTIC CLEAVAGE OF SULFIDES
Bernard Loev, Broomall, Pa., and John F. Olin, Kettering, Dayton, Ohio, assignors to Pennsalt Chemical Corporation, Philadelphia, Pa., a corporation of Pennsylvania
No Drawing. Filed Aug. 23, 1960, Ser. No. 51,295
14 Claims. (Cl. 260—609)

This invention relates to a novel process for preparing mercaptans and, in particular, deals with the preparation of primary mercaptans by cleaving organic sulfides in the presence of catalysts.

Organic mercaptans are a well-known class of organic compounds which are useful in numerous and varied applications. Mercaptans, per se, are useful, for example, as odorants and as polymerization modifiers and they are also of great importance as intermediates to the preparation of herbicides, insecticides, rubber chemicals, oil additives, and pharmaceuticals.

Numerous methods for the preparation of mercaptans are known, but only a few are commercially feasible. $H_2S$ is known to add to olefins according to Markownikoff's rule to yield secondary or tertiary mercaptans. The catalytic reaction of $H_2S$ on normal alcohols generally gives primary mercaptans, but this process is frequently an undersirable procedure to carry out commercially because of the cost of the alcohol, the formation of by-products, and the difficulty of separating pure product from the reaction mixture. Under the influence of ultraviolet light, addition of $H_2S$ to olefins occurs abnormally (i.e., contrary to Markownikoff's rule), to give primary mercaptans, but to avoid sulfide formation this reaction requires very low temperatures and expensive equipment. While still other methods are available for primary mercaptans, no one method is entirely satisfactory and the need for novel techniques for primary mercaptan synthesis is well recognized in the art.

In an investigation made by Faragher et al. as reported in Ind. & Eng. Chem., 20, 527 (1928), it was observed that thermal cleavage of diethylsulfide and diisoamylsulfide at 496° C. gave only small quantities of mercaptan products. Furthermore, there was considerable loss of products and thus no commercial possibilities for the reaction appeared likely. Now, however, it has been found that if certain organic sulfides are cleaved in the presence of catalysts, a wide variety of complex primary mercaptans may be made easily and in good yield. In addition, it has been found by this invention that primary mercaptans can be formed in a manner whereby all reagents and products are efficiently used in an integrated process.

According to this invention, primary mercaptans are prepared by catalytically decomposing (by cleavage) an organic sulfide having the structure $R_1$—$CH_2$—S—$R_2$ where $R_1$ is an organic radical bonded to the —$CH_2$— group by a carbon atom and $R_2$ is an organic radical taken from the group consisting of alkyl, cycloalkyl and aralkyl radicals, said $R_2$ radicals containing at least two carbon atoms and having at least one hydrogen atom attached to a carbon atom in beta position to the sulfur atom. The products of this decomposition are the desired mercaptan and, as by-product, an ethylenically unsaturated compound. (This unsaturated by-product is also of value as will be seen in subsequent paragraphs.) To illustrate this process, the decomposition of ethyl tert-butyl sulfide is shown as follows:

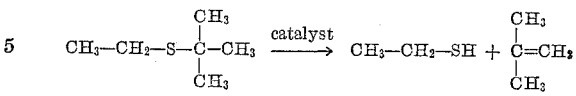

The above decomposition or cleavage of the sulfide is brought about by any one of several catalytic techniques.

In one catalytic technique, the sulfide will simply be contacted with acidic or other catalytic materials, usually at elevated temperatures. Such catalysts will be selected from the class of dehydration catalysts such as alumina, silica, thoria, aluminum silicates (acid clays) and the like; metal sulfides such as the sulfides of magnesium, zinc, iron, cobalt, nickel, tin, chromium, platinum and the like; and acid materials stable to the reaction conditions employed, e.g., oxygen acids of the elements of boron, phosphorous, silica, and sulfur. The temperature at which the catalytic cleavage will occur will usually be between 100° C. and 450° C., depending, of course, upon the thermal stability of the reactants. Preferably, temperatures between about 150° and 350° C. will be used. Where possible the cleavage will be carried out preferably in the vapor phase. The vapors of the sulfide are simply passed through or over the catalytic substance and the effluent gases separated to obtain the product mercaptan. The catalysts may be supported or unsupported and if supported the usual catalyst supports may be used (e.g., carbon, kieselguhr, $Al_2O_3$, $SiO_2$, etc.).

In a second technique, cleavage by acid-catalyzed hydrolysis will be used by heating at about 100° to 250° C., a solution or suspension of the sulfide in the presence of an acid. Preferably, the acid catalyst should be devoid of strong oxidizing properties. Such nonoxidizing acids are well known and include the inorganic, nonoxidizing acids such as halogen acids (e.g., HF, HCl, HBr), dilute sulfuric acid, phosphoric acid, and the organic acids such as alkanesulfonic acids and the like. The sulfide hydrolysis may be made to occur in water, if the sulfide is soluble, or in an organic solvent such as a halogen resistant alcohol (e.g., isobutanol), or in the conventional inert solvents (e.g., benzene, toluene, petroleum ether, xylene, and other aromatic and aliphatic hydrocarbons).

Because it lends itself to simple and economical commercial production, reaction in the vapor phase is preferred, although in some particular cases (e.g., where the product mercaptan is water-insoluble and can be filtered off), the liquid phase catalytic hydrolysis is more useful.

The sulfides used as starting materials for the process of this invention are, as indicated, defined by the formula $R_1$—$CH_2$—S—$R_2$. Because the process of this invention is operable at relatively low temperatures due to the effect of the catalyst used, $R_1$ is not limited to any particular group or function and may be any organic radical bonded to the —$CH_2$— group through a carbon atom. Thus, $R_1$ will include alkyl, cycloalkyl, aryl, aralkyl, alkaryl and heterocyclic radicals. These radicals may also be substituted with functional groups such as halogeno, amino, alkoxy, aryloxy, acyloxy, nitro, nitroso, carboxy, hydroxy, formal, sulfo, sulfino, olefinic, cyanato, isocyanato and like groups. These substituents are generally stable at the temperatures used in this process in either one or both of the vapor phase catalytic thermal cleavage or the catalytic hydrolytic cleavage. Such substituents do not interfere with the reaction even though they may themselves undergo reaction under certain conditions. In certain cases it will be advantageous that the substituent on the R₁ group be reactive with mercaptans, for in this way valuable sulfur-containing products or polymers may be made. For example, a sulfide in which the R₁ group contains a group reactable with mercaptans may be subjected to the process of this invention to form the mercaptan, which, because it contains two mutually reactive groups, will, in turn, react to form a polymer. In addition, the R₁ radical may contain additional —CH₂—S—R₂ groups, thus permitting the formation of polymercaptans; e.g.,

R₂—S—CH₂—R₁—CH₂—S—R₂→HSCH₂—R₁—CH₂SH

Examples of specific compounds which undergo this double cleavage are 1,2-bis(tert-butylthio)ethane and 1,4-bis(tert-butylthio)butane which give 1,2-ethanedithiol and 1,4-butanedithiol respectively; e.g.,

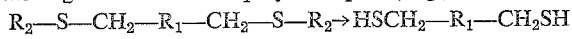
$$(CH_3)_3-C-S-CH_2-CH_2-S-C-(CH_3)_3 \xrightarrow{\text{cleavage}}$$
$$HS-CH_2-CH_2-SH + 2C_4H_8$$

The R₁ radical may contain functional groups which can be subjected to further reaction without isolation of the mercaptan. For example, if the R₁ radical contains a nitrile group, the sulfide may be cleaved and hydrolyzed to carboxylic acid in one step; viz.:

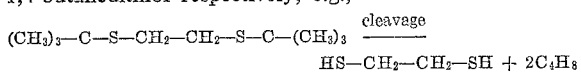

Some further specific examples illustrating R₁ are as follows:

Aliphatic alkyl and alkenyl radicals such as those containing one to twenty carbon atoms (methyl, n-butyl, n-hexyl, n-octyl, lauryl, stearyl, vinyl, n-pentenyl, etc.) and aryl- and cyclic-substituted aliphatic radicals such as benzyl, phenyloctadecyl, naphthylmethyl, cyclohexylethyl, etc.; oxygen-containing aliphatic and cycloaliphatic radicals such as isopropoxyethyl, carbomethoxymethyl, etc.; halogen-containing radicals such as 2-fluoroethyl, 3-bromo-n-octyl; aromatic radicals such as phenyl, chlorophenyl, nitrophenyl, etc.; heterocyclic radicals such as pyridyl, quinolyl, thiazyl, etc. Many additional specific examples of R₁ radicals will be found in the disclosure of columns 2 to 6 of U.S. Patent 2,822,374. A preferred class of R₁ radicals is the aliphatic and aromatic alkyl radicals containing 1 to 12 carbon atoms and of this class the preferred groups are alkyl, cyanoalkyl, hydroxyalkyl, and aminoalkyl radicals.

The R₂ radical of the sulfide R₁—CH₂—S—R₂ will be selected from the group consisting of alkyl, cycloalkyl, and aralkyl radicals, said R₂ radicals containing at least two carbon atoms and having at least one hydrogen atom attached to a carbon atom beta to the sulfur atom. Thus, the —S—R₂ structure must contain the grouping

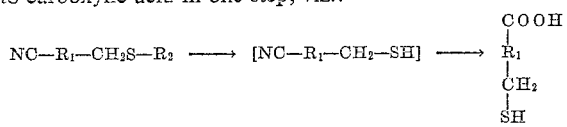

Or, stated another way, R₂ must contain a hydrogen atom on a carbon atom in beta position to the sulfur atom. This is a limitation required by the nature of this process so that an olefin can be formed with the mercaptan product as the decomposition of the sulfide occurs; viz.,

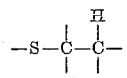

The alkyl, cycloalkyl and aralkyl radicals that contain the

group will preferably be attached to the sulfur atom by a tertiary carbon atom (e.g.,

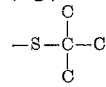

since these groups cleave more easily to form olefins than do primary or secondary structures. They are also preferred because, as will be seen, thioethers with such structures can easily and inexpensively be obtained. However, the process of this invention is operable when R₂ is a primary or secondary group and in certain cases such groups are particularly useful. For example, when a mixture of mercaptan products is desired, as for example in certain odorant preparations, R₁ and R₂ may be primary with advantage:

CH₃—CH₂—CH₂—S—CH₂—CH₂—CH₂—CH₃→
CH₃—CH₂—CH₂—SH + CH₃—CH₂—CH₂—
CH₂—SH + olefins

Since symmetrical sulfides are easily obtained, this invention also has advantage in the cleavage of symmetrical sulfides in that the olefin formed may be recycled to react with H₂S and form the original sulfide. Thus:

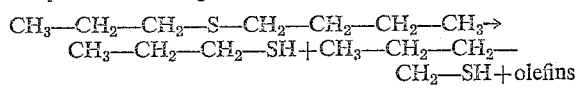

It is thus apparent that complete utilization of all reactants is possible and a very efficient and economical process results. A recycle process is also of great value with asymmetric sulfides, particularly with those asymmetric sulfides containing a tertiary alkyl radical, e.g.:

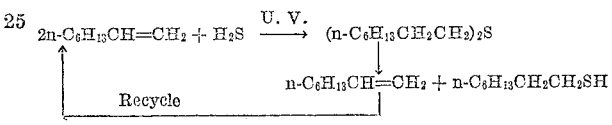

Where the asymmetric sulfide is one in which both R₁ and R₂ are primary the cleavage will produce a mixture of products as shown above. However, when R₂ is tertiary the major advantage of the recycle process is realized in that cleavage is achieved easily and the tertiary olefin obtained is readily reactable with H₂S for mercaptan formation.

Some illustrative groups which R₂ may be are: ethyl, n-propyl, isopropyl, n-, sec- and tert-butyl, n-hexyl, cyclopentyl, cyclohexyl, n-, iso- and tert-octyl, phenethyl, phenylpropyl, naphthylethyl, naphthobenzyl, dodecyl, octadecyl, and the like. The preferred class from which R₂ will be selected is the class of alkyl groups containing 2 to 18 carbon atoms and of this class the tertiary alkyl radicals are preferred.

The sulfide starting materials for the process of this invention are prepared by methods known in the art. One method by which these sulfides may be made is by the free radical catalyzed abnormal addition of a mercaptan to a 1-olefin; e.g.

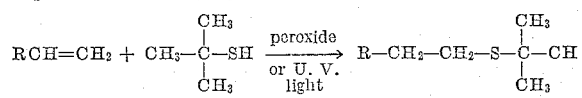

This is a particularly useful reaction to provide the desired sulfide starting material because of the great facility with which the reaction occurs. As indicated above, the mercaptan adds to the olefin in a manner abnormal to that predicted by Markownikoff's rule. The mercaptan selected to react with the olefin will preferably be a tertiary mercaptan, but any mercaptan can be used providing, of course, the addition product (i.e., the sulfide) will have the structure defined above. The order of preference for the selection of the mercaptan is tertiary>secondary>primary. The tertiary mercaptans are readily synthesized from low-cost tertiary intermediates (e.g., isobutylene, diisobutylene, propylene trimer, propylene tetramer, etc.) and the sulfide products are easily decomposed to the desired mercaptan products. Some useful commercially available tertiary mercaptans for this technique include tert-butyl mercaptan, isopropyl mercaptan, tert-nonyl mercaptan, tert-dodecyl mercaptan and mixed tertiary mercaptans.

It will, of course, be understood that when using this particular method of sulfide synthesis the product mercaptan obtained by the process of this invention is determined by the olefin used to obtain the sulfide. Thus a wide variety of mercaptans may be prepared by selection of the many olefins available. The following table will illustrate the versatility of the method and illustrate some of the numerous complex types of mercaptans that this invention yields:

$n_D^{30}$ 1.4458) contains 82.2% octyl mercaptan, small amounts of octene and isobutylene, the balance being uncleaved sulfide. On distillation at atmospheric pressure, a small forerun is obtained containing small amounts of octene and 2-octyl mercaptan, and then the product distills pure. The cleavage gives an 88% conversion, and the total amount of secondary mercaptan present is less than 5%.

*Example 2.—Cleavage of Di-n-Octyl Sulfide*

$H_2S$ is bubbled through 303 g. (2.7 moles) of octene-1 maintained at 47° C. while the liquid is being exposed to the ultraviolet light source described in Example 1. After 35 minutes, a 60% conversion is obtained (analysis by refractive index change) and after 1.5 hours a 77% conversion to di-n-octyl sulfide is obtained, along with about 10% n-octyl mercaptan.

Using the conditions described in Example 1, the

TABLE I

| Olefin reacted with H—S—C—(R)$_3$ | Sulfide formed | Mercaptan product obtained |
|---|---|---|
| $CH_3$—$CH$=$CH_2$ | $CH_3$—$CH_2$—$CH_2$—S—C(R)$_3$ | $CH_3CH_2CH_2$—SH |
| $CH_3CH_2CH$=$CH_2$ | $CH_3CH_2CH_2$—$CH_2$—S—C(R)$_3$ | $CH_3CH_2CH_2CH_2SH$ |
| $(CH_3)_2C$=$CH_2$ | $(CH_3)_2CH$—$CH_2S$—C—(R)$_3$ | $(CH_3)_2$—CH—$CH_2$—SH |
| $CH_2$=$CH$—$CH$=$CH_2$ | (R)$_3$—S—$(CH_2)_4$—S—(R)$_3$ | HS—$(CH_2)_4$—SH |
| $CH_2$=$CH$—C$_6$H$_5$ | C$_6$H$_5$—$CH_2$—$CH_2$—S—C—(R)$_3$ | C$_6$H$_5$—$CH_3$—$CH_2$—SH |
| $CH_2$=$CH$—Cl | Cl—$CH_2$—$CH_2$—S—C—(R)$_3$ | Cl—$CH_2$—$CH_2$—SH |
| 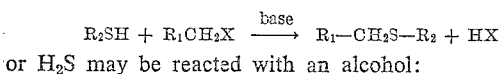 | 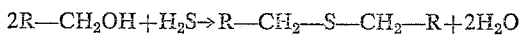 | pyridyl-$CH_2CH_2$—SH |

As indicated, other methods of preparing the sulfides may be used. For example, the appropriate alkyl halide may be reacted with a mercaptan under basic catalysis:

$$R_2SH + R_1CH_2X \xrightarrow{base} R_1—CH_2S—R_2 + HX$$

or $H_2S$ may be reacted with an alcohol:

$$2R—CH_2OH + H_2S \rightarrow R—CH_2—S—CH_2—R + 2H_2O$$

Numerous other methods are also available, as is disclosed in the literature (cf.: Wagner and Zook, Synthetic Organic Chemistry, Wiley, 1953).

The following examples will further amplify and illustrate the invention:

*Example 1.—Cleavage of n-Octyl-Tert-Butyl Sulfide*

A mixture of 200 g. (1.78 moles) of octene-1 and 99 g. (1.1 moles) of tert-butyl mercaptan is exposed to ultraviolet light. The U.V. source used is a Hanovia 550 watt lamp which is inserted into a water-cooled quartz tube and is immersed in the liquid. At the end of 4 hours, the reaction is 94.5% complete. The crude n-octyl tert-butyl sulfide is pale yellow, and is used directly, without isolation, for the cleavage step.

40.5 g. of the n-octyl tert-butyl sulfide is added dropwise to a 500 ml. flask whose bottom is covered with finely powdered catalyst which consists of phosphoric acid deposited on kieselguhr. (The flask is heated by immersing it in a Woods metal bath.) The catalyst temperature is maintained at about 250° C. and no column is used. As the sulfide is added, copious fumes evolve and a colorless liquid distills out (B.P. 180–195° C.). After all the sulfide is added and distillation is completed, the system is put under vacuum to remove the last amounts of product. The crude product (35 g., octyl sulfide is added to the phosphoric acid catalyst held at 250° C. and a colorless product distills (B.P. 170–220° C.). This crude distillate contains 26.4% n-octyl mercaptan, the balance being octene-1 and uncleaved octyl sulfide. This represents a 50% conversion to product mercaptan.

In like manner n-butyl-tertiary-butyl sulfide is cleaved to n-butyl mercaptan and isobutylene.

*Example 3.—Cleavage of n-Octyl Tert-Nonyl Sulfide Using Alumina*

55 g. of crude n-octyl tert-nonyl sulfide (prepared from tert-nonyl mercaptan plus octene using U.V. light) is slowly added to a 500 ml. flask containing about 50 g. of $Al_2O_3$ held at temperatures between 250° and 300° C. The system is under a slight vacuum to remove the cleavage products as formed. The colorless distillate analyzes for 48.7% octyl mercaptan by weight, and corresponds to a 77% conversion.

*Example 4.—Preparation of Beta-Mercaptopropionic Acid*

Three grams of sodium are dissolved in 60 ml. of methanol and to the sodium methylate formed there is added 2944 grams of tert-dodecyl mercaptan. The solution of sodium tert-dodecyl mercaptide in tert-dodecyl mercaptan is freed of methanol by warming under vacuum. It is then placed in a five-liter three-necked flask equipped with dropping funnel, thermometer and stirrer. Over a one-hour period, 773 grams of acrylonitrile are dropped in while holding the temperature at about 35° C.

After standing overnight, the product is transferred to a twelve-liter flask containing 2860 grams of 37% aqueous hydrochloric acid. It is then refluxed with stirring at 102° to 114° C. for three hours. Then the reaction mass is cooled to 8° C. and the ammonium chloride filtered out. The dodecene layer of the filtrate is washed with water in a separating funnel until free of acid. The water washes are combined and dehydrated azeotropically with benzene. The residue is then vacuum distilled and 1078 grams of a portion distilling at 92° to 100° at 0.8 mm. pressure is collected. Analysis shows this to be 99.1% beta-mercaptopropionic acid. The yield is 71.4% based on the acrylonitrile.

*Example 5.—Preparation of Benzylmercaptan*

Benzyl bromide is reacted with the potassium salt of tert-octyl mercaptan in cyclohexanol at 130° C. The resulting benzyl tert-octyl sulfide is hydrolyzed in aqueous HI solution at 150° C. to yield benzyl mercaptan and $C_8H_{16}$.

*Example 6*

One mole of 3-bromopropane-1-ol is reacted with 1 mole of sodium tert-dodecyl mercaptide and this product is then hydrolyzed at 175° C. with 50% phosphoric acid. In this way 1 mole of 3-mercaptopropane-1-ol and 1 mole of dodecene are obtained.

*Example 7*

One mole of beta-chloroethyldiethylamine is reacted with one-half mole of calcium di-tert-hexadecyl mercaptide to yield the sulfide, viz.:

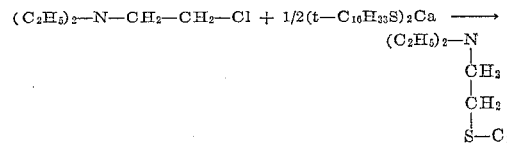

This product on hydrolysis with 25% aqueous sulfuric acid yields beta-diethylaminoethyl mercaptan in good yield.

*Example 8*

One-third mole of 2-bromomethylpyridine is reacted with one-sixth mole of calcium di-(tert-butyl)mercaptide to give 2-pyridylmethyl tert-butyl sulfide.

On hydrolysis of the 2-pyridylmethyl tert-butyl sulfide with 25% aqueous sulfuric acid, 2-pyridylmethylmercaptan is produced.

*Example 9.—Integrated Process*

A mixture of tert-butyl mercaptan and octene-1 is exposed to U. V. light for four hours and the resulting sulfide is brought into contact with a hot powdered catalyst consisting of phosphoric acid on kieselguhr as described in Example 1. The distillate is passed through a water-cooled condenser and the n-octyl mercaptan and the unconverted sulfide are collected in a receiver held at 0° C. The isobutylene by-product passes uncondensed through this receiver and is collected by passing into a Dry-Ice acetone cooled flask equipped with a Dry-Ice condenser. The cold, liquid isobutylene is pumped into a continuous fixed bed reactor where it is mixed with a four-fold molar excess of hydrogen sulfide and passed over a phosphoric acid on kieselguhr catalyst at 100° C. and 135 p.s.i.g. pressure. The pumping rate of the isobutylene is adjusted to give it an hourly space velocity of approximately 65. The hourly space velocity is defined as the cubic centimeters of vapor at standard temperature and pressure passed over the catalyst per hour per cubic centimeter of catalyst. In this way an 87% conversion to tert-butyl mercaptan is obtained. This reactant is then collected, warmed to remove unreacted isobutylene and hydrogen sulfide, and recycled directly into the U.V. reactor to form more tert-butyl n-octyl sulfide for the cleavage reaction.

The overall conversion of octene-1 to n-octyl mercaptan for this process is 75%.

VAPOR PHASE REACTIONS

*Example 10*

Normal octyl tertiary-butyl sulfide is passed through a preheater designed to vaporize the sulfide and then through a tubular reaction chamber filled with finely ground catalyst. The vapors exit to a collection vessel fitted with a water cooled condenser. The sulfide passes through the reactor at a space velocity of 224 cc. of vapor at standard temperature and pressure per hour per cubic centimeter of catalyst. The following table shows the catalysts and conditions used and the results obtained.

TABLE II

| Catalyst | Reactor temp., ° C. | Preheater temp., ° C. | Percent conversion to n-$C_8H_{17}SH$ [1] | Percent yield [2] |
|---|---|---|---|---|
| Phosphoric acid on kieselguhr [3] | 150 | 150 | 73.0 | 88.6 |
| Do.[3] | 200 | 200 | 83.0 | 91.6 |
| Do.[3] | 250 | 250 | 84.3 | 91.0 |
| Do.[3] | 300 | 250 | 86.5 | [4] 92.7 |
| Do.[3] | 350 | 250 | 78.8 | 91.0 |
| Do.[3] | 400 | 250 | 65.6 | 76.1 |
| Activated alumina | 300 | 250 | 45.0 | 76.8 |
| 13% alumina on silica [5] | 150 | 150 | 78.4 | 95.9 |
| Do.[5] | 200 | 200 | 84.0 | 95.5 |
| Do.[5] | 250 | 250 | 78.3 | 88.3 |
| 10% ferrous sulfide on alumina [6][7] | 200 | 200 | 29.5 | 97.5 |
| Do.[6][7] | 250 | 250 | 32.3 | 83.9 |
| Do.[6][7] | 300 | 300 | 30.0 | 80.0 |

[1] Per pass, based on sulfide.
[2] Percent yield=percent conversion to mercaptan plus percent of unconverted sulfide.
[3] Universal Oil Products Polymerization Catalyst #2, fines.
[4] Analysis of this run shows that the crude mercaptan consists on a weight basis of 87% normal-octyl mercaptan, 5% octene, and 6% unreacted sulfide.
[5] Purchased as Houdry S90 catalyst pellets and ground to 14 to 20 mesh.
[6] Prepared by impregnating 14 to 20 mesh activated alumina with aqueous $FeCl_3$ solution, precipitating $Fe(OH)_3$ with caustic, washing free of chlorides and treating with $H_2S$.
[7] Space velocity with this catalyst is 170 cc. vapor at STP/hr./cc. of catalyst.

*Example 11*

Using essentially the same procedure of Example 10, normal octyl tertiary-dodecyl sulfide is passed over a catalyst of phosphoric acid on kieselguhr (Universal Oil Products Polymerization Catalyst—#2) at a space velocity of 192 cc. vapor at STP per hour per cc. of catalyst. The process is carried out at reduced pressures as shown in the following Table III.

TABLE III

| Preheater and reactor temp., ° C. | Pressure of reactor system, mm. Hg | Percent conversion to n-$C_8H_{17}SH$ |
|---|---|---|
| 200 | 115 | 38.4 |
| 250 | 115 | 53.4 |
| 300 | 115 | 64.1 |
| 300 | 400 | 34.4 |
| 350 | 115 | 47.0 |

It is evident from the above examples that the novel process of this invention permits a wide variety of mercaptans to be readily prepared and it is apparent that this invention is a significant advance in the art. It will be understood that many variations in the above described process may be made wtihout departing from the spirit and scope of this invention.

We claim:
1. The process of catalytically cleaving an organic sulfide to a primary mercaptan and an olefin, said organic sulfide having the structure $R_1CH_2$—S—$R_2$ where $R_1$ is an organic radical selected from the group of aliphatic, aromatic, and heterocyclic radicals containing up to twelve carbon atoms, and $R_2$ is a tertiary alkyl radical containing up to eighteen carbon atoms, said $R_2$ radical having at least one hydrogen atom on a carbon atom beta to the sulfur atom, said process being carried out at a temperature between about 100° C. and 350° C. and in the presence of a catalyst selected from the group consisting of (a) an oxide selected from the group consisting of aluminum, silicon, and thorium, (b) metal sulfides, (c) halogen acids, and (d) an oxygen acid selected from the class consisting of the oxygen acids of the elements of boron, phosphorus, silica, and sulfur.

2. The process of claim 1 wherein the catalyst is an oxygen acid deposited on a support.

3. The process of claim 1 wherein the catalyst is alumina.

4. The process of claim 1 wherein the catalyst is silica.

5. The process of claim 1 wherein the catalyst is aluminia deposited on silica.

6. The process of claim 1 wherein the catalyst is phosphoric acid on kieselguhr.

7. The process of cleaving an organic sulfide to a primary mercaptan and an olefin by acid hydrolysis with a non-oxidizing acid at a temperature between about 100° C. and 250° C., said organic sulfide having the structure $R_1$—$CH_2$—S—$R_2$ where $R_1$ is an organic radical selected from the group of aliphatic, aromatic, and heterocyclic radicals containing up to twelve carbon atoms, and $R_2$ is a teritary alkyl radical containing up to eighteen carbon atoms, said $R_2$ radical having at least one hydrogen atom on a carbon atom beta to the sulfur atom.

8. The process of claim 7 wherein the catalyst is a non-oxidizing acid.

9. The process of claim 7 wherein the catalyst is phosphoric acid.

10. The process of claim 7 wherein the catalyst is a halogen acid.

11. An integrated process for the preparation of primary mercaptans in which an olefin is converted to a sulfide by reaction with a tertiary alkyl mercaptan, the sulfide catalytically cleaved as in claim 1 to primary mercaptan and olefin product, and the olefin product recycled to form additional sulfide.

12. An integrated cyclic process for the preparation of primary mercaptans in which a sulfide of structure $R_1$—$CH_2$—S—$R_2$, where $R_1$ is an organic radical selected from the group of aliphatic, aromatic, and heterocyclic radicals containing up to twelve carbon atoms and $R_2$ is a tertiary alkyl radical having a hydrogen atom on a carbon atom beta to the sulfide sulfur atom is thermally cleaved to mercaptan and olefin at a temperature between about 100° and 350° C. in the presence of a catalyst selected from the group consisting of dehydration catalysts and thermally stable oxygen acids, separating said olefin and converting it to reactant sulfide for recycle.

13. A process for making n-octyl mercaptant which comprises thermally cleaving n-octyl-tertiary butyl sulfide in the presence of a catalyst selected from the group consisting of dehydration catalysts and thermally stable oxygen acids.

14. A process for making n-butyl mercaptan which comprises thermally cleaving n-butyl-tertiarybutyl sulfide in the presence of a catalyst selected from the group consisting of dehydration catalysts and thermally stable oxygen acids.

References Cited in the file of this patent

UNITED STATES PATENTS

| | | |
|---|---|---|
| 2,366,453 | Meadow | Jan. 2, 1945 |
| 2,490,875 | Landau | Dec. 13, 1949 |